United States Patent
Lee et al.

(10) Patent No.: US 12,221,700 B2
(45) Date of Patent: Feb. 11, 2025

(54) HIGH-STRENGTH ALUMINUM COATED STEEL SHEET HAVING EXCELLENT ANTI-CORROSION PROPERTIES AND WELDABILITY, AND MANUFACTURING METHOD THEREOF

(71) Applicant: POSCO CO., LTD, Pohang-si (KR)

(72) Inventors: Suk-Kyu Lee, Gwangyang-si (KR); Jong-Gi Oh, Gwangyang-si (KR); Myung-Soo Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/266,269

(22) PCT Filed: Dec. 15, 2021

(86) PCT No.: PCT/KR2021/019043
§ 371 (c)(1),
(2) Date: Jun. 8, 2023

(87) PCT Pub. No.: WO2022/131779
PCT Pub. Date: Jun. 23, 2022

(65) Prior Publication Data
US 2024/0026514 A1    Jan. 25, 2024

(30) Foreign Application Priority Data
Dec. 18, 2020   (KR) .................. 10-2020-0178157

(51) Int. Cl.
*C23C 2/02*    (2006.01)
*C21D 8/02*    (2006.01)
(Continued)

(52) U.S. Cl.
CPC ............. *C23C 2/02* (2013.01); *C21D 8/0273* (2013.01); *C21D 9/46* (2013.01); *C22C 21/10* (2013.01);
(Continued)

(58) Field of Classification Search
None
See application file for complete search history.

(56) References Cited

U.S. PATENT DOCUMENTS

2014/0377583 A1   12/2014   Tsuru et al.
2019/0292617 A1    9/2019   Iung et al.
(Continued)

FOREIGN PATENT DOCUMENTS

EP        3730665        10/2020
JP      2004263268    *   9/2004
(Continued)

OTHER PUBLICATIONS

International Search Report—PCT/KR2021/019043 dated Apr. 20, 2022.
(Continued)

*Primary Examiner* — Daniel J. Schleis
(74) *Attorney, Agent, or Firm* — CANTOR COLBURN LLP

(57) ABSTRACT

Provided is an aluminum coated steel sheet having excellent anti-corrosion properties and weldability, and a manufacturing method thereof. The aluminum coated steel sheet includes: an austenitic base steel sheet including at least 70 area % of an austenite microstructure; and an aluminum coating layer formed on the base steel sheet, wherein the base steel sheet includes at least 80 area % of ferrite in a surface layer portion, which denotes a region extending from the interface with the coating layer to a depth of 100 μm into the base steel sheet, and the aluminum coating layer may have a composition comprising 2-12 wt % of Si, 5-30 wt % of Zn, and 0.1-5 wt % of Mn, with the balance being Al and inevitable impurities.

13 Claims, 2 Drawing Sheets

(51) Int. Cl.
- *C21D 9/46* (2006.01)
- *C22C 21/10* (2006.01)
- *C22C 38/04* (2006.01)
- *C22C 38/06* (2006.01)
- *C23C 2/00* (2006.01)
- *C23C 2/12* (2006.01)
- *C23C 2/40* (2006.01)

(52) U.S. Cl.
CPC .............. *C22C 38/04* (2013.01); *C22C 38/06* (2013.01); *C23C 2/022* (2022.08); *C23C 2/12* (2013.01); *C23C 2/40* (2013.01); *C23C 2/522* (2022.08); *C21D 2211/001* (2013.01); *C21D 2211/005* (2013.01)

(56) References Cited

U.S. PATENT DOCUMENTS

| | | |
|---|---|---|
| 2020/0216927 A1 | 7/2020 | Jin et al. |
| 2020/0262181 A1 | 8/2020 | Kim et al. |
| 2021/0340650 A1 | 11/2021 | Park et al. |
| 2022/0056564 A1 | 2/2022 | Kang et al. |
| 2022/0170164 A1* | 6/2022 | Köhler .................... C22C 38/22 |

FOREIGN PATENT DOCUMENTS

| | | |
|---|---|---|
| JP | 2006037130 | 2/2006 |
| JP | 2019519679 A | 7/2019 |
| JP | 2020521056 A | 7/2020 |
| KR | 20140092900 | 7/2014 |
| KR | 20160077558 | 7/2016 |
| KR | 20180087435 | 8/2018 |
| KR | 20190076796 | 7/2019 |
| KR | 20190130681 | 11/2019 |
| KR | 20200035740 | 4/2020 |
| KR | 20200076796 A | 6/2020 |
| WO | 2017203341 | 11/2017 |
| WO | WO2020201136 | * 10/2020 |

OTHER PUBLICATIONS

Japanese Office Action—Japanese Application No. 2023-536397 issued on Sep. 3, 2024, citing JP 2020-521056, KR 10-2020-0076796, and JP 2019-519679.

* cited by examiner

HIGH-STRENGTH ALUMINUM COATED STEEL SHEET HAVING EXCELLENT ANTI-CORROSION PROPERTIES AND WELDABILITY, AND MANUFACTURING METHOD THEREOF

TECHNICAL FIELD

The present disclosure relates to a high-strength aluminum coated steel sheet having excellent anti-corrosion properties and weldability and a manufacturing method thereof.

BACKGROUND ART

In order to secure the anti-corrosion properties of a steel sheet, a coated steel sheet coated with a surface of the steel sheet is widely used.

In order to manufacture the coated steel sheet, a process of annealing a full hard steel sheet in a cold-rolled state, dipping the steel sheet in a coating bath at a temperature similar to that of the coating bath so that a surface of the steel sheet is wetted with the coating solution is performed. However, dual phase (DP) steel or transformation induced plasticity (TRIP) steel, which are representative high-strength steel sheets, include a large amount of hard structures, such as martensite, inside. Since strength and elongation of the steel sheet are significantly reduced by annealing heat treatment, it may be technically difficult to obtain a coated steel sheet having a high strength-elongation balance (TS×El).

In addition, a coated steel sheet widely used as the coated steel sheet may include a galvanized steel sheet formed with a Zn-based coating layer and an aluminum coated steel sheet formed with an aluminum-based coating layer. Since the Zn-based galvanized steel sheet has a lower corrosion potential of Zn compared to a ferrous base steel sheet and exhibits the so-called sacrificial method characteristics in which Zn corrodes first instead of iron, the Zn-based galvanized steel sheet is evaluated as a steel sheet having excellent anti-corrosion properties. However, since the Zn-based coating layer has a low melting point and a low-viscosity molten coating solution, the Zn-based coating layer has a problem of liquid metal embrittlement (LME) in which the molten coating solution penetrates into microcracks or the like occurring during the welding and causes cracks. Since the aluminum coating has a higher melting point than Zn, the aluminum coating has a relatively lower risk of liquid metal embrittlement. However, the aluminum coating may secure anti-corrosion properties by blocking a contact between the atmosphere and the base steel sheet, but it does not have the same electrochemical anti-corrosion properties as the sacrificial method like zinc coating. As a result, when the base steel sheet comes into contact with the atmosphere due to cracks or the like in the coating layer, it may be difficult to suppress corrosion. Therefore, the aluminum coating is evaluated to be inferior in anti-corrosion properties compared to the zinc coating, and an Al—Zn-based coating layer in which a predetermined amount of Zn is added is proposed to improve the anti-corrosion properties of such aluminum coating. However, even this Al—Zn-based coating layer may not completely solve the problem of liquid metal embrittlement, and therefore, there is still a need for a technical solution to simultaneously solve the problems of the anti-corrosion properties and liquid metal embrittlement.

In addition, when alloying does not sufficiently occur between a coating film and the base steel sheet, the adhesion between the base steel sheet and the coating film may not be sufficient and the coating film may peel off.

DISCLOSURE

Technical Problem

The present disclosure provides a high-strength aluminum coated steel sheet capable of minimizing a decrease in strength due to heat treatment before coating, as an aluminum coated steel sheet having excellent anti-corrosion properties without causing a problem of liquid metal embrittlement.

The present disclosure provides a high-strength aluminum coated steel sheet having excellent adhesion between a base steel sheet and a coating film.

The technical subject of the present disclosure is not limited to the above. Those skilled in the art to which the present disclosure pertains will have no difficulty in understanding the additional objects of the present disclosure from the contents throughout the present specification.

Technical Solution

In an aspect in the present disclosure, an aluminum coated steel sheet may include: an austenitic base steel sheet including at least 70 area % of an austenite microstructure; and an aluminum coating layer formed on the base steel sheet, wherein the base steel sheet includes at least 80 area % of ferrite in a surface layer portion, which denotes a region extending from an interface with the coating layer to a depth of 100 into the base steel sheet, in which the aluminum coating layer may have a composition comprising 2 to 12 wt % of Si, 5 to 30 wt % of Zn, and 0.1 to 5 wt % of Mn, with the balance being Al and inevitable impurities.

In another aspect in the present disclosure, a manufacturing method of an aluminum coated steel sheet may include: preparing an austenitic base steel sheet including at least 70 area % of an austenite microstructure; performing annealing heat treatment on the austenitic base steel sheet under a condition that a temperature of a soaking zone and a temperature of a dew point are 750 to 870° C. and −5 to 20° C., respectively; and immersing the heat-treated austenitic base steel sheet, which has a composition including Si: 2 to 12 wt %, Zn: 5 to 30 wt %, Mn: 0.1 to 3 wt %, with the balance being Al and inevitable impurities, in a coating bath maintained at a temperature of 550 to 650° C., and hot-dip coating the heat-treated austenitic base steel sheet.

Advantageous Effects

As set forth above, according to the present disclosure, by using austenitic high Mn steel as a base steel sheet, it is possible to solve a problem of a decrease in strength due to structural transformation even during heat treatment before coating and control a composition of a coating layer, and by making a surface layer portion of the base steel sheet composed of an austenite microstructure into a ferrite structure, it is possible to significantly improve resistance to liquid metal embrittlement as well as anti-corrosion properties. In addition, by including Mn in the coating layer, it is possible to prevent a decrease in adhesion between the coating layer and the base steel sheet.

BEST MODE

Figure 1:
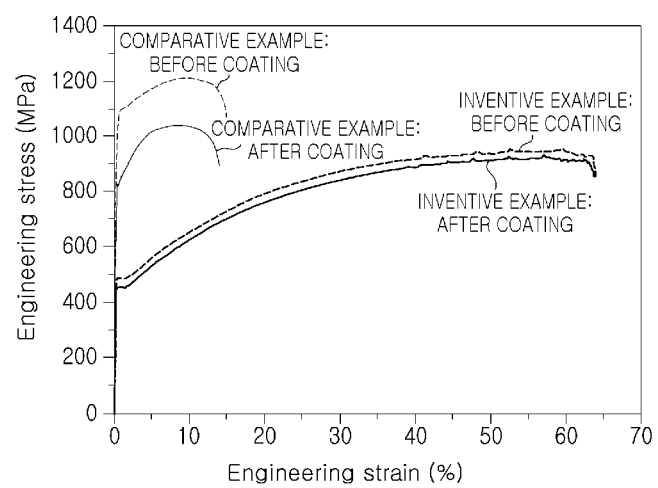
FIG. 1 is a graph showing tensile curves before and after coating of Comparative Examples and Inventive Examples.

Hereinafter, the present disclosure will be described in detail.

The inventors of the present disclosure have come to invent the present disclosure by founding that, when using austenitic steel as a base steel sheet of a coated steel sheet, it was possible to prevent deterioration in material such as strength and elongation by heat treatment before coating, so a high-strength coated steel sheet capable of maintaining TS×El at a high level may be manufactured.

The austenitic steel sheet, which is the base steel sheet of the coated steel sheet of the present disclosure, may contain 70% or more of the austenite microstructure based on area (meaning a ratio in a region including a surface layer portion described later). Since austenite is a stable structure even at room temperature, transformation into other structures may be minimized even when heated, so changes in physical properties before and after heating may be minimized. The higher the austenite ratio in the steel sheet of the present disclosure, the more advantageous it is, so the upper limit is not particularly limited and the ratio of the austenite microstructure may be 100%. According to one embodiment of the present disclosure, the ratio of the austenite microstructure in the microstructure of the steel sheet may be 80% or more. The remaining structures other than austenite are not particularly limited, and may include, for example, one or more of various structures that may appear inside the steel, such as ferrite, bainite, martensite, and pearlite. Examples of a commercially available steel sheet that satisfies the structural conditions of the present disclosure may include twin induced plasticity (TWIP) steel.

In addition, according to one implementation embodiment of the present disclosure, the surface layer portion of the base steel sheet of the present disclosure may include ferrite as a main structure. That is, by making the structure of the surface layer portion into the ferrite structure, the occurrence of microcracks may be suppressed, and therefore, the occurrence of liquid metal embrittlement due to penetration of a molten coating layer into cracks during welding may be suppressed. In the present disclosure, the surface layer portion denotes a region extending from the surface of the base steel sheet to a depth of 100 μm. In one implementation embodiment of the present disclosure, a ratio of the ferrite in the surface layer portion may be 80% or more based on an area, and the surface layer portion may be formed of a single phase of the ferrite.

In one implementation embodiment of the present disclosure, ratios of each structure may be obtained when observing a cross section of a steel sheet cut in a thickness direction.

In the present disclosure, as one method of obtaining the steel sheet having the austenite microstructure, a steel sheet of high Mn steel having a high Mn content may be used as the base steel sheet. The high Mn steel as used herein refers to steel having 5 wt % or more of Mn. Hereinafter, when referring to compositions of the steel sheet and the coating layer in the present disclosure, it is necessary to note that a unit of content is based on a weight unless otherwise indicated. Mn is a typical element that stabilizes austenite, and the Mn content is set to 5% or more, so the ratio of austenite in the steel sheet may be maintained at a targeted level in the present disclosure. However, when the Mn content is excessive, non-coating may occur or coating adhesion may deteriorate, so the upper limit of the content may be set to 25%. In one implementation embodiment of the present disclosure, the range of the Mn content may be set to 15 to 20%.

In addition, although not necessarily limited thereto, the base steel sheet may further include C: 0.4 to 0.8%, Al: 0.5 to 3%, and B: 50 ppm or less in addition to Mn.

C is an element that stabilizes austenite, and when the C content is low, the austenite may not be sufficiently formed, whereas, when the C content is excessive, weldability may deteriorate. Therefore, considering this point, in one implementation embodiment of the present disclosure, the content of C may be set to 0.4 to 0.8%. In another implementation embodiment of the present disclosure, the C content may be set to 0.5 to 0.6%.

In addition, Al is added in an amount of 0.4% or more as an element effective in preventing the occurrence of hydrogen embrittlement. When the Al content is excessive, it may cause a problem of nozzle clogging during continuous casting, so the upper limit of the Al content is set to 3%. In one implementation embodiment of the present disclosure, the range of the Al content may be set to 0.5 to 1.5%.

Although not essential, there may be cases where B is added to increase the strength of the base steel sheet. However, when the B content is excessive, the non-coating may occur or the coating adhesion may deteriorate, so the upper limit of the B content may be set to 50 ppm. In the present disclosure, the B may not be added as an optional element (i.e., 0% may be included), but in one implementation embodiment, the lower limit of the B content may be 5 ppm.

The austenite high Mn steel sheet of the present disclosure may further include elements such as Ti, Nb, and Mo in a total amount of 0.5% or less in addition to the above-described elements, if necessary.

According to one implementation embodiment of the present disclosure, the base steel sheet may be a hot-rolled steel sheet or a cold-rolled steel sheet, but the type of the base steel sheet is not particularly limited.

The present disclosure also specifically limits the composition of the coating layer to prevent liquid metal embrittlement and increase the adhesion of the coating layer. The coating layer according to one implementation embodiment of the present disclosure may have a composition of Si: 0.7 to 5%, Zn: 1.5 to 15%, Mn: 0.1 to 1.5%, with the balance being Al and inevitable impurities.

Among the coating layers, Si plays a role of suppressing growth of an Al—Fe alloy layer during hot-dip coating, and when Si is added in an amount of 0.7% or more, the excessive growth of the Al—Fe alloy layer may be suppressed to secure the coating adhesion. However, when the Si content exceeds 5%, the growth of the Al—Fe alloy layer is excessively suppressed, so liquid metal embrittlement may occur. That is, since the Al—Fe alloy layer also serves to prevent the molten coating layer from flowing into the base steel sheet, in one implementation embodiment of the present disclosure, it is intended to avoid that the growth of the Al—Fe alloy layer is extremely inhibited due to the addition of the excessively high Si content.

In addition, among the coating layers, Zn is added to impart sacrificial anti-corrosion properties to the aluminum coating layer, and is added in an amount of 1.5% or more. However, when the Zn content is excessive, the melting point of the molten coating layer may be lowered and fluidity increased, so liquid metal embrittlement is highly likely to occur. As a result, a value of the Zn content is limited to 15% or less.

In the present disclosure, coating adhesion is increased by adding 0.1% or more of Mn. However, when the Mn content exceeds 1.5%, the formation of the Al—Fe alloy phase is suppressed and liquid metal embrittlement may occur, so the upper limit of the Mn content is set to be 1.5%. In the present disclosure, the Mn may be derived from a coating bath, but since a high Mn steel sheet is used, a significant amount of Mn may be diffused in the base steel sheet and included in the coating layer.

In one implementation embodiment of the present disclosure, the coating layer may further include 10 to 60% of Fe. Fe is included in the coating layer due to being formed in the reaction between the base steel sheet and the coating bath as the coating bath and the base steel sheet come into contact with each other, and may be included up to 60% or less. The lower limit of the Fe content is not particularly limited, but when considering typical operating conditions, the Fe content of the coating layer may be set to 10% or more.

In the present disclosure, Mg may be added in an amount of 2.5% or less, if necessary, to improve the anti-corrosion properties of the coating layer.

In one implementation embodiment of the present disclosure, in addition to the above-described elements, the coating layer may further include Cr, Mo, Ni, or the like in a total content of 0.5% or less.

Hereinafter, a manufacturing method of a high-strength aluminum coated steel sheet of the present disclosure will be described.

First, a step of preparing an austenitic base steel sheet is performed. The austenitic base steel sheet characteristics are as described above.

Then, it is necessary to perform annealing heat treatment on the prepared base steel sheet in a temperature range of 750 to 870° C. based on a soaking zone. Since austenite is not sufficiently formed less than 750° C., it is difficult to secure sufficient austenite phase, and even if the temperature exceeds 870° C., the austenite is sufficiently formed, so the temperature no longer needs to rise. In this case, a temperature of a dew point in the soaking zone needs to be controlled to −5 to 20° C. By controlling the temperature of the dew point to be within this range, appropriate internal oxidation and decarburization occur in the surface layer portion of the steel sheet, thereby controlling the structure of the surface layer portion to the ferrite structure. That is, examples of elements that stabilize the austenite microstructure may include Mn and C. Since the content of these elements may be greatly reduced in the surface layer portion by the internal oxidation, the structure of the surface layer portion may be controlled with the ferrite. When the temperature of the dew point is less than −5° C., since it is difficult to cause the internal oxidation reaction of the surface layer portion, it is difficult to maintain the structure of the surface layer portion as the ferrite. In addition, instead of the internal oxidation, the surface oxidation occurs, so that a large amount of oxide is generated on the surface, thereby hindering alloying. As a result, the coating adhesion may deteriorate. Conversely, when the temperature of the dew point exceeds 20° C., since the oxidation occurs not only inside the base steel sheet but also on the surface of the base steel, a large amount of oxide is distributed on the surface, so the wettability with the coating bath deteriorates during the coating and the coating adhesion deteriorates.

Thereafter, the heat-treated base steel sheet needs to be hot-dip coated by being immersed in the coating bath of 550 to 650° C. When the temperature of the coating bath is less than 550° C., there may be a problem in that the viscosity of the coating bath increases and the fluidity decreases, and when the temperature of the coating bath exceeds 650° C., there may be a problem in that a lifetime of a sink roll in the coating bath is shortened and a lot of dross is generated. The composition of the coating bath may include Si: 2 to 12%, Zn: 5 to 30%, Mn: 0.1 to 3%, with the balance being Al and inevitable impurities, in consideration of the composition of the finally formed coating layer. In one implementation embodiment of the present disclosure, Fe may be further included in an amount of 4% or less. In addition, in order to secure the anti-corrosion properties of the coating layer, 5% or less of Mg may be further included. In addition, it is as described above in the composition of the coating layer that Cr, Mo, and Ni may additionally be included in a total amount of 0.5% or less.

When the base steel sheet is dipped in the coating bath, the temperature of the steel sheet may be 550 to 700° C. When the temperature of the steel sheet is too low, since the sufficient surface quality may not be obtained, the temperature of the steel sheet to be dipped may be 550° C. or higher. However, when the temperature is too high, the temperature of the coating bath may rise due to the temperature of the steel sheet, it may be discarded, and since the amount of elution from the steel sheet may increase and the durability of the plating device may decrease, the upper limit of the temperature of the steel sheet may be set at 700° C. In one implementation embodiment of the present disclosure, the temperature at the time of the immersion of the steel sheet may be set to the temperature of the coating bath to the temperature of the coating bath +30° C.

After performing the hot-dip coating on the steel sheet by the above-described process, the high-strength aluminum coated steel sheet may be manufactured by adjusting the coating adhesion amount with the known adhesion amount control means such as an air knife. The adhesion amount is not particularly limited, but may be limited to 10~100 g/m² per side of the steel sheet.

Mode for Invention

Hereinafter, the present disclosure will be described in more detail with reference to Examples. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

EXAMPLE

Example 1

A cold-rolled steel sheet (sheet thickness of 1.2 mm) having a composition (unit wt %, however, a content unit of B is ppm, and the remaining components not shown are substantially Fe) and structure configuration (unit area %) shown in Table 1 below was prepared, and was subjected to annealing heat treatment by heating a soaking zone to a temperature of 830° C. During the annealing heat treatment, a dew point was controlled as shown in Table 2. The heated steel sheet was dipped in a coating bath having the composition (unit: wt %, the remaining components not shown are aluminum) shown in Table 2 maintained at a temperature of 620° C. The temperature of the steel sheet before immersion was controlled to 620° C. (±3° C.) in all examples. After immersion in the coating bath, the aluminum coated steel sheet was prepared by controlling the coating adhesion amount to 60 g/m² per side using an air knife.

TABLE 1

| | \multicolumn{9}{c|}{Steel type} | |
|---|---|---|---|---|---|---|---|---|---|
| | C | Mn | —{ }—Al | B | Ti | Nb | Mo | Austenite ratio | Type of remaining structures |
| Comparative Steel 1 | 0.3 | 27 | 2.0 | 150 | 0.2 | — | — | 69 | Ferrite martensite |
| Comparative Steel 2 | 0.9 | 4.5 | 0.5 | 3 | — | 0.1 | 0.2 | 55 | Ferrite martensite |
| Inventive steel 1 | 0.6 | 16 | 1.8 | 15 | — | — | 0.2 | 72 | Ferrite |
| Inventive steel 2 | 0.7 | 22 | 1.5 | 20 | 0.2 | 0.1 | — | 100 | — |

TABLE 2

| Division | Steel type | Dew point of soaking zone (° C.) | Composition of coating bath (wt %) | | | | |
|---|---|---|---|---|---|---|---|
| | | | Si | Zn | Mn | Mg | Fe |
| Comparative Example 1 | Comparative Steel 1 | 5 | 2 | 3 | 0.1 | — | 1.5 |
| Comparative Example 2 | Comparative Steel 2 | 5 | 2 | 5 | 0.1 | 0.5 | 1.5 |
| Inventive Example 1 | Inventive steel 1 | −5 | 2 | 25 | 0.5 | — | 1.5 |
| Comparative Example 3 | Inventive steel 1 | −10 | 2 | 25 | 0.5 | — | 1.5 |
| Comparative Example 4 | Inventive steel 1 | 25 | 2 | 25 | 0.5 | — | 1.5 |
| Comparative Example 5 | Inventive steel 1 | −10 | 2 | 5 | 0.1 | 0.5 | 1.5 |
| Comparative Example 6 | Inventive steel 1 | 25 | 2 | 5 | 0.1 | 0.5 | 1.5 |
| Comparative Example 7 | Inventive steel 1 | −20 | 12 | 30 | 3 | 5 | 1.5 |
| Inventive Example 2 | Inventive steel 1 | 20 | 12 | 30 | 3 | 5 | 1.5 |
| Inventive Example 3 | Inventive steel 2 | 5 | 2 | 5 | 0.1 | 0.5 | 1.5 |

In Table 3, the composition (unit: wt %, the remaining components not shown are aluminum) of the coating layer of the coated steel sheet obtained for each example, the ferrite ratio (unit: area %) of the surface layer portion, the anti-corrosion properties, the weldability, the tensile strength (MPa), and the coating adhesion were shown. As shown in Table 3, the austenite ratio of the base steel sheet of the coated steel sheet did not greatly deviate from the values shown in Table 1 showing the structure of the base steel sheet before coating, and the type of the remaining structure (not shown in Table 3) was found to be the same. However, in the case of Inventive Example 3 (Inventive Steel 2 was used as the base steel sheet), it was confirmed that ferrite was formed in the remaining structure.

The anti-corrosion properties of the coated steel sheet were determined according to the following criteria.

It was performed by a method of charging each molten aluminum alloy coated steel sheet into a salt spray tester, spraying 5% salt water (temperature: 35° C., pH: 6.8) at 1 ml/80 cm² per hour, and after 2400 hours of the charging, determining whether red rust occurred. That is, the case in which red rust did not occur was determined as "⊚ (excellent)," the case in which red rust occurred in 50% or less of the surface area of the steel sheet is determined as "○ (good)," and the case in which red rust occurred in excess of 50% of the surface area of the steel sheet was determined as "x (bad)."

The weldability of the coated steel sheet was determined according to the following criteria.

To evaluate liquid metal embrittlement, welding was performed under the conditions of a pressure of 4.0 kN and a welding current of 0.5 kA using a Cu—Cr electrode having a tip diameter of 6 mm. After welding, the length of the LME crack formed on the cross section was measured by a scanning electron microscope (FE-SEM). As a result of the measurement, the case in which the length of the LME crack is 150 μm or less was evaluated as "⊚ (excellent)," the case in which the length of the LME crack is greater than 150 μm and 500 μm or less was evaluated as "○ (good)," and the case in which the LME crack length exceeded 500 μm was evaluated as "x (bad)."

The coating adhesion was determined according to the following criteria.

An automotive structural sealer was applied to a specimen having an area of 75 mm×150 mm in an area of 10 mm×40 mm and a thickness of 5 mm, cured at 175° C. for 25 minutes, and then bent at 90° to visually observe the peeling of the sealer. The case in which the sealer is attached to the base iron as it is and the peeling does not occur between the sealers was evaluated as "⊚ (excellent)," the case in which the coating layer is peeled off but the area ratio of the coating layer attached to the sealer and peeled off is 10% or less was evaluated as "○ (good)," and the case in which the area ratio of the coating layer attached to the sealer and peeled off exceeded 10% was evaluated as "x (bad)."

TABLE 3

| Division | Composition of coating layer | | | | | Austenite ratio | Ferrite ratio of surface layer portion | Anti-corrosion property | Weldability | TS × El (MPa %) | Plating adhesion |
|---|---|---|---|---|---|---|---|---|---|---|---|
| | Si | Zn | Mn | Mg | Fe | | | | | | |
| Comparative Example 1 | 1.3 | 2.0 | 0.1 | — | 30 | 65 | 60 | X | X | 15,000 | ○ |
| Comparative Example 2 | 1.5 | 3.6 | 0.1 | 0.4 | 20 | 40 | 70 | ○ | X | 13,000 | ○ |
| Inventive Example 1 | 1.0 | 15.0 | 0.2 | — | 30 | 70 | 80 | ○ | ○ | 50,500 | ○ |
| Comparative Example 3 | 1.4 | 17.5 | 0.3 | — | 1.5 | 71 | 30 | ○ | X | 50,500 | X |

TABLE 3-continued

| Division | Composition of coating layer | | | | | Austenite ratio | Ferrite ratio of surface layer portion | Anti-corrosion property | Weldability | TS × El (MPa %) | Plating adhesion |
| --- | --- | --- | --- | --- | --- | --- | --- | --- | --- | --- | --- |
| | Si | Zn | Mn | Mg | Fe | | | | | | |
| Comparative Example 4 | 1.4 | 17.5 | 0.3 | — | 1.5 | 71 | 100 | ○ | ○ | 50,500 | X |
| Comparative Example 5 | 1.8 | 4.5 | 0.1 | 0.4 | 1.5 | 70 | 15 | ○ | X | 54,300 | ○ |
| Comparative Example 6 | 1.8 | 4.5 | 0.1 | 0.4 | 1.5 | 72 | 100 | ○ | ○ | 50,500 | X |
| Comparative Example 7 | 5.3 | 13.2 | 1.3 | 2.2 | 4 | 71 | 20 | ◎ | X | 50,500 | X |
| Inventive Example 2 | 5.0 | 12.4 | 1.5 | 2.1 | 10 | 70 | 100 | ◎ | ◎ | 50,500 | ◎ |
| Inventive Example 3 | 0.7 | 1.8 | 0.1 | 0.2 | 60 | 98 | 95 | ○ | ○ | 54,300 | ○ |

Comparative Example 1 and Comparative Example 2 correspond to the case the ferrite structure of the surface layer portion did not fall within in the range of the present disclosure, as the case in which the process conditions met the range specified in the present disclosure but the content of C or Mn in the base steel sheet was insufficient. As can be seen in Table 3, in the case of Comparative Examples 1 and 2, in which the ratio of the ferrite structure of the surface layer portion of the steel sheet structure is less than 80%, it was not possible to prevent LME cracks from occurring during welding, resulting in poor weldability. In addition, in the case of Comparative Example 2, the Zn content in the coating layer was not sufficient, resulting in insufficient anti-corrosion properties. In addition, since both Comparative Examples 1 and 2 did not have a high austenite ratio, it was difficult to maintain a high balance (TS×El) of strength and elongation even after heat treatment, so the values of the strength and elongation balance were only 15,000 MPa % and 13,000 MPa %, respectively, and were not suitable for steel materials requiring high strength and elongation.

In Comparative Examples 3, 5, and 7, the temperature of the dew point of the soaking zone during annealing was lower than the value specified in the present disclosure. When the temperature of the dew point is too low, the internal oxidation and decarburization of the steel sheet surface are difficult to occur, whereas the surface oxidation will occur. As a result, not only is it difficult to keep the ferrite ratio of the surface layer portion high, but also the alloying between the coating layer and the steel sheet is insufficient due to the oxide on the surface. As a result, as shown in Table 3, the poor weldability and coating adhesion were obtained.

In Comparative Examples 4 and 6, the temperature of the dew point was excessively high, and the ferrite ratio of the surface layer portion satisfied the conditions of the present disclosure, but excessive oxides were formed on the surface, resulting in poor coating adhesion.

As the inventive examples compared to the above Comparative Examples, as can be seen from the results of Table 3, the inventive examples 1 to 3 that meet the conditions of the present disclosure were all excellent in the anti-corrosion properties, weldability, the strength-elongation balance, and the coating adhesion.

FIG. 1 illustrated the results of a tensile test performed on Comparative Example 1 (Comparative Example in the drawing) and Inventive Example 2 (Inventive Example in the drawing). As can be seen from the graph of the drawing, in the case of Inventive Example 2 satisfying the conditions of the present disclosure, it could be seen that the decrease in the tensile strength and elongation before and after the coating hardly occurred. However, in the case of Comparative Example 1, it could be confirmed that the change in strength before and after the coating was severe due to the lack of the austenite ratio in the base steel sheet, and the elongation rate also slightly decreased.

Figure 2:
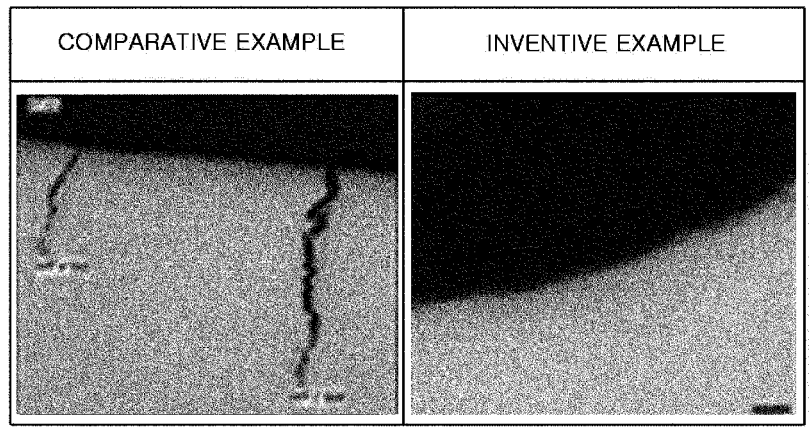
FIG. 2 is photographs of observed welded parts of Comparative Example 1 and Inventive Example 2.

FIG. 2 is a photograph of the observed welded parts of Comparative Example 1 and Inventive Example 2. As can be seen from the figure, in the case of Comparative Example 1, many LME cracks were generated at the welded part, but in Inventive Example 2, no LME cracks were observed and the excellent weldability was shown.

Figure 3:
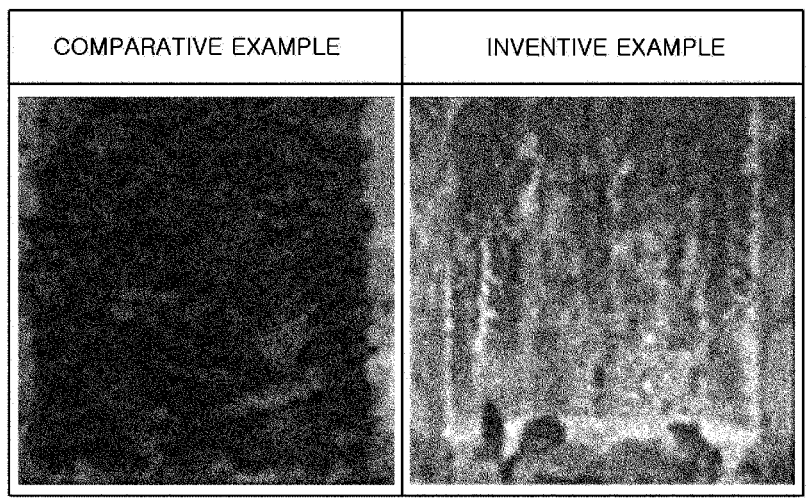
FIG. 3 is photographs of evaluated anti-corrosion properties of Comparative Example 1 and Inventive Example 2.

FIG. 3 is a result of evaluating the anti-corrosion properties of Comparative Example 1 and Inventive Example 2, and as can be seen in the photographs of the drawing, Inventive Example 2 exhibited much better anti-corrosion properties than Comparative Example 1.

As reviewed through the above examples, it was possible to confirm the advantageous effects of the present disclosure.

The invention claimed is:

1. An aluminum coated steel sheet, comprising:
   an austenitic base steel sheet including at least 70 area % of an austenite microstructure and an aluminum coating layer formed on the base steel sheet,
   wherein the base steel sheet includes at least 80 area % of ferrite in a surface layer portion, which denotes a region extending from an interface with the coating layer to a depth of 100 μm into the base steel sheet, and
   the aluminum coating layer has a composition including 0.7 to 5 wt % of Si, 1.5 to 15 wt % of Zn, and 0.1 to 1.5 wt % of Mn, with balance being Al and inevitable impurities.

2. The aluminum coated steel sheet of claim 1, wherein the aluminum coating layer further includes one or both of Fe: 10 to 60 wt % and Mg: 2.5 wt % or less.

3. The aluminum coated steel sheet of claim 2, wherein the aluminum coating layer further includes Cr, Mo and Ni in a total content of 0.5 wt % or less.

4. The aluminum coated steel sheet of claim 1, wherein the austenitic base steel sheet includes 5 to 25 wt % of Mn.

5. The aluminum coated steel sheet of claim 1, wherein the austenitic base steel sheet has a composition including Mn: 5 to 25 wt %, C: 0.4 to 0.8 wt %, Al: 0.5 to 3 wt %, B: 50 ppm or less, balance being Fe, and inevitable impurities.

6. The aluminum coated steel sheet of claim 5, wherein the austenitic base steel sheet further includes Ti, Nb, and Mo in a total amount of 0.5 wt % or less.

7. A manufacturing method of an aluminum coated steel sheet, comprising:
preparing an austenitic base steel sheet including at least 70 area % of an austenite microstructure;
performing annealing heat treatment on the austenitic base steel sheet under a condition that a temperature of a soaking zone and a temperature of a dew point are 750 to 870° C. and −5 to 20° C., respectively to form a surface layer portion, which denotes a region extending from an interface with the coating layer to a depth of 100 μm into the base steel sheet and includes at least 80 area % of ferrite, through internal oxidation; and
hot-dip coating the heat-treated austenitic base steel sheet by dipping the heat-treated austenitic base steel sheet, in a coating bath maintained at a temperature of 550 to 650° C, wherein the coating bath has a composition including Si: 2 to 12 wt %, Zn: 5 to 30 wt %, Mn: 0.1 to 3 wt %, with balance being Al and inevitable impurities.

8. The manufacturing method of claim 7, wherein the coating bath further includes one or both of Fe: 4 wt % or less and Mg: 5 wt % or less.

9. The manufacturing method of claim 7, wherein the coating bath further includes Cr, Mo and Ni in a total content of 0.5 wt % or less.

10. The manufacturing method of claim 7, wherein a temperature of the steel sheet when the austenitic base steel sheet is dipped in the coating bath is 550 to 650° C.

11. The manufacturing method of claim 7, wherein the austenitic base steel sheet contains 5 to 25 wt % of Mn.

12. The manufacturing method of claim 7, wherein the austenitic base steel sheet has a composition including Mn: 5 to 25 wt %, C: 0.4 to 0.8 wt %, Al: 0.5 to 3 wt %, B: 50 ppm or less, balance being Fe, and inevitable impurities.

13. The manufacturing method of claim 12, wherein the austenitic base steel sheet further contains Ti, Nb, and Mo in a total amount of 0.5 wt % or less.

* * * * *